(12) United States Patent
Sample et al.

(10) Patent No.: US 10,230,167 B2
(45) Date of Patent: Mar. 12, 2019

(54) ELECTROMAGNETIC TIME REVERSAL FOCUSING OF NEAR FIELD WAVES IN METAMATERIALS

(71) Applicant: DISNEY ENTERPRISES, INC., Burbank, CA (US)

(72) Inventors: Alanson Sample, Pittsburgh, PA (US); Matthew Chabalko, Wilkinsburg, PA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 15/721,196

(22) Filed: Sep. 29, 2017

(65) Prior Publication Data
US 2018/0226723 A1    Aug. 9, 2018

Related U.S. Application Data

(60) Provisional application No. 62/454,354, filed on Feb. 3, 2017.

(51) Int. Cl.
*H01Q 15/00* (2006.01)
*H01Q 19/06* (2006.01)
*H02J 50/27* (2016.01)

(52) U.S. Cl.
CPC ....... *H01Q 15/0086* (2013.01); *H01Q 19/062* (2013.01); *H02J 50/27* (2016.02)

(58) Field of Classification Search
CPC ............ H01Q 15/0086; H01Q 9/0407; H01Q 9/0442; H01Q 15/10; H01Q 13/103; H01Q 5/48; H02J 50/20; H02J 50/27
See application file for complete search history.

(56) References Cited

U.S. PATENT DOCUMENTS

| | | | |
|---|---|---|---|
| 2008/0258981 A1* | 10/2008 | Achour | H01Q 21/065 343/702 |
| 2009/0296226 A1* | 12/2009 | Bowers | B82Y 20/00 359/642 |

(Continued)

OTHER PUBLICATIONS

Fink et al, "Time-Reversed Waves and Super-Resolution", C.R. Physique 10 (2009) 447-463.*

*Primary Examiner* — David E Smith
(74) *Attorney, Agent, or Firm* — Robert G. Crouch; Marsh Fischmann & Breyfogle LLP

(57) ABSTRACT

Selective focusing of electromagnetic energy via the electromagnetic time reversal in the near field of a metamaterial. The disclosure begins with fundamental mathematics, and then is extended to the experimental realm where focusing in space and time of the magnetic fields in the near field of a 1-Dimensional metamaterial is shown. Under time reversal focusing, peak instantaneous fields at receiver locations are at minimum 200% greater than other receivers. The strongly-selective focusing capabilities of the system can be employed to show individual and selective powering of light emitting diodes connected to coil receivers placed in the near field of the metamaterial. The results show the possibility of improving display technologies, near field imaging systems, increasing channel capacity of near field communication systems, and obtaining a greater control of energy delivery in wireless power transfer systems.

20 Claims, 11 Drawing Sheets

(56) References Cited

U.S. PATENT DOCUMENTS

2013/0021112 A1* 1/2013 Apostolos ............... H01Q 1/52
                                                    333/174
2016/0020648 A1* 1/2016 Contopanagos ..... H01Q 19/185
                                                    307/104
2017/0069973 A1* 3/2017 Black ..................... H01Q 3/28

* cited by examiner

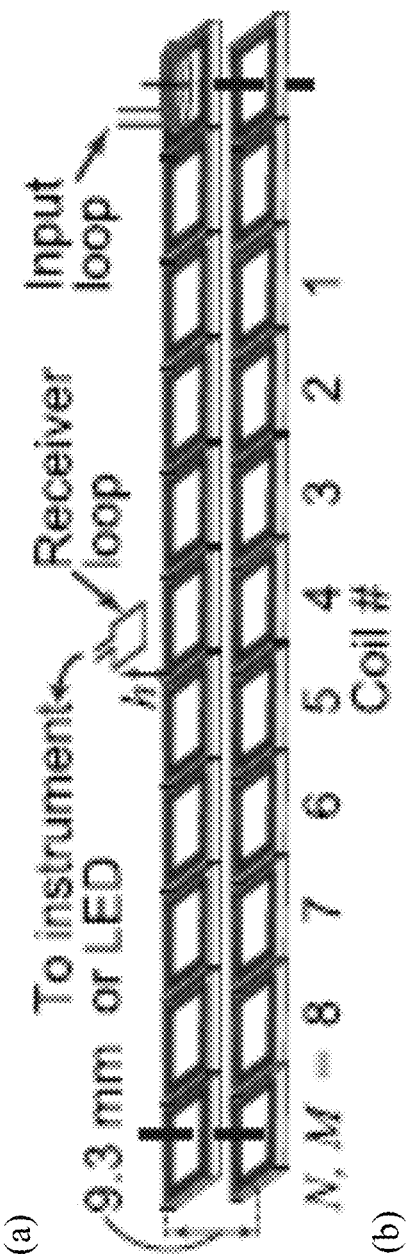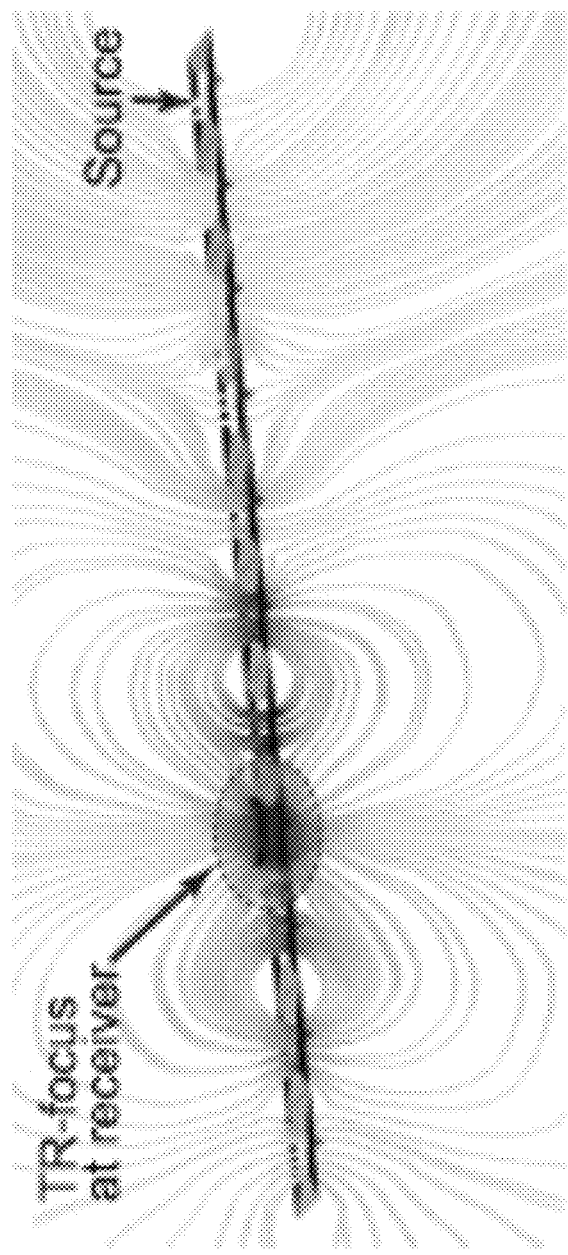
FIG. 2(a)
FIG. 2(b)

ELECTROMAGNETIC TIME REVERSAL FOCUSING OF NEAR FIELD WAVES IN METAMATERIALS

CROSS-REFERENCE TO RELATED APPLICATIONS

This application claims the benefit of U.S. Provisional Application No. 62/454,354, filed Feb. 3, 2017, the contents of which are incorporated herein by reference in its entirety.

BACKGROUND

Precise control of electromagnetic energy on a deeply subwavelength scale in the near field regime is a fundamentally challenging problem. Generally, subwavelength scales are defined as length scales smaller than the free space wavelength of an electromagnetic wave oscillating at a given frequency. More specifically, in the RF frequencies used in RFID (nominally 1 GHz, although it covers a range at least as wide as 100 kHz to 10 GHz), the wavelength is in the range of 30 centimeters, so the subwavelength scale includes distances smaller than this. The ability to control and focus energy on a subwavelength scale is necessary for innovation in technologies, for example, such as near field imaging, near field communication (NFC), radio frequency identification (RFID), and wireless power transfer. These examples rely on manipulation of electromagnetic energy on a subwavelength scale, and would benefit greatly from techniques that allow manipulation of this energy on scales that are smaller than a wavelength.

Manipulation of electromagnetic (EM) energy in the subwavelength regime is a topic of broad interest to physicists and engineers alike. In the far field regime, a technique used to focus energy (with resolution even below the classical diffraction limit) at a desired point in space and time is known as the electromagnetic time reversal (TR). Electromagnetic time reversal (TR) refers to the invariance of Maxwell's Equations even when time, t, is replaced by its negative, −t, which still produces a consistent set of Maxwell's equations. As a result of reciprocity, the evolution of the fields between a source and receiver can be "rewound" in time by using the aforementioned "−t" substitution. Thus, signals observed by a receiver or receiver array can be recorded, reversed in time, and then rebroadcast into the channel from which they came where they then retrace their steps back to the source and constructively interfere to focus in space and time.

It is against this background that the techniques described herein have been developed.

SUMMARY

Disclosed herein is a method for focusing RF energy, including: providing an RF energy source that generates RF electromagnetic energy in a predetermined RF frequency range having a center RF frequency and a corresponding center RF wavelength; providing a metamaterial that has a spatially-periodic characteristic, the metamaterial having a first location therein and a second location therein, wherein the second location is located at a distance from the first location that is less than the center RF wavelength; providing a source port coupled to the RF energy source, the source port positioned adjacent to the first location in the metamaterial; and applying a time-varying RF electromagnetic energy signal with the RF energy source to the source port, wherein the time-varying RF electromagnetic energy signal is a time-reversed version of an impulse response that would be received at one of the first and second locations in response to an impulse of RF electromagnetic energy introduced into the other of the first and second locations.

The applying of the signal to the source terminal at the first location may cause a focusing of RF energy at the second location in the metamaterial. The focusing of RF energy at the second location may include the RF energy being significantly greater in magnitude instantaneously at the second location than at a location immediately adjacent the second location. The focusing of RF energy at the second location may include the RF energy being significantly greater in magnitude instantaneously at the second location than at any other location in the metamaterial. The focusing of RF energy at the second location in the metamaterial may be used for power transfer. The focusing of RF energy at the second location in the metamaterial may be used for data transfer. The focusing of RF energy at the second location in the metamaterial may be used for sensing.

The time-varying RF-electromagnetic energy signal may be generated by: applying an impulse of RF electromagnetic energy into the other of the first and second locations; recording an impulse response at the one of the first and second locations in response to the impulse of RF electromagnetic energy; and producing the time-reversed time-varying RF-electromagnetic energy signal based on the recorded impulse response.

The metamaterial may include a series of spaced-apart coupled resonators, a two-dimensional array of spaced-apart coupled resonators, or a three-dimensional array of spaced-apart coupled resonators.

The first location in the metamaterial may be a selectable location.

Also disclosed is a method for focusing RF energy, including: providing an RF energy source that generates RF electromagnetic energy at a predetermined RF frequency range having a center RF frequency and a corresponding center RF wavelength; providing a metamaterial that has a spatially-periodic characteristic, the metamaterial having a first location therein and a second location therein, wherein the second location is located at a distance from the first location that is less than the center RF wavelength; applying an impulse of RF electromagnetic energy into one of the first and second locations; recording an impulse response at the other of the first and second locations in response to the impulse of RF electromagnetic energy; producing a time-reversed time-varying RF-electromagnetic energy signal based on the recorded impulse response; providing a source port coupled to the RF energy source, the source port positioned adjacent to the first location in the metamaterial; and applying to the source port the time-reversed time-varying RF electromagnetic energy signal with the RF energy source.

The applying of the signal to the source terminal at the first location may cause a focusing of RF energy at the second location in the metamaterial. The focusing of RF energy at the second location may include the RF energy being significantly greater in magnitude instantaneously at the second location than at a location immediately adjacent the second location. The metamaterial may include a two-dimensional array of spaced-apart coupled resonators.

Also disclosed is a system, comprising: an RF energy source that generates energy at a predetermined RF frequency range having a center RF frequency and a corresponding center RF wavelength; a metamaterial that has a spatially-periodic characteristic; an RF energy source terminal located at a first location and a first orientation relative to the metamaterial; and an RF energy receiver terminal located at a second location and a second orientation relative to the metamaterial, wherein the second location is located at a distance from the first location that is less than the center RF wavelength. The RF energy source applies a time-varying RF electromagnetic energy signal with the RF energy source to the source port, wherein the time-varying RF electromagnetic energy signal is a time-reversed version of an impulse response that would be received at one of the first and second locations in response to an impulse of RF electromagnetic energy introduced into the other of the first and second locations.

The applying of the signal to the source terminal at the first location may cause a focusing of RF energy at the second location. The focusing of RF energy at the second location may include the RF energy being significantly greater in magnitude instantaneously at the second location than at a location immediately adjacent the second location. The time-varying RF-electromagnetic energy signal may be generated by: applying an impulse of RF electromagnetic energy into the other of the first and second locations; recording an impulse response at the one of the first and second locations in response to the impulse of RF electromagnetic energy; and producing the time-reversed time-varying RF-electromagnetic energy signal based on the recorded impulse response.

BRIEF DESCRIPTION OF THE DRAWINGS

FIG. 2(a) is an illustration of selected portions of the arrangement of FIG. 1(c).

FIG. 2(b) is an illustration of electromagnetic flux lines at various locations along the arrangement of FIG. 2(a).

DETAILED DESCRIPTION

Figure 1A:
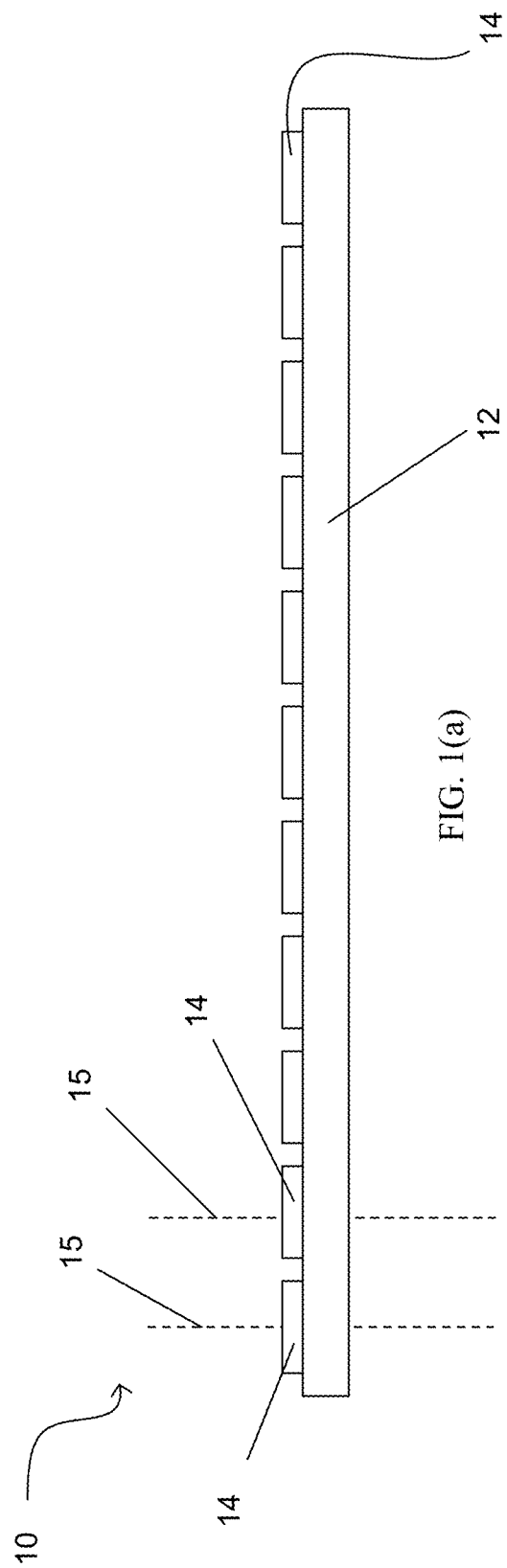
FIG. 1(a) an illustration of a PCB with a plurality of spaced-apart coils thereon.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

As part of addressing the problems described in the background above, it has been recognized that in general, the TR focusing effect is more pronounced when the channel response between one or more sources and one or more receivers are dispersive. Electromagnetic time reversal is a technique broadly known and investigated in the literature especially in high frequency, far-field systems for focusing electromagnetic energy to spots that are below the classical diffraction limit. Herein, however, we explicitly use time reversal and exploit its focusing effects using a near field medium (i.e. a metamaterial operating in the deeply sub-wavelength regime). Metamaterials are materials engineered to have properties not found in nature, often with structures having repeating patterns at scales that are smaller than the wavelengths of the phenomena they seek to influence. A metamaterial can be any material that periodically stores electric fields and magnetic fields. This could include an array of coils or of some other type of periodic structure, as desired and as may effective to act as a metamaterial when exposed to electromagnetic energy. Thus it could include different types of structures depending on the frequency of the electromagnetic energy. Leveraging metamaterials as a near field channel for exploiting time reversal to gain control over the focus of electromagnetic energy allows us to selectively focus electromagnetic energy on scales that are smaller than a wavelength, and perhaps much smaller than a wavelength. Thus, the structures can be made to act as near field lenses of electromagnetic energy and provide highly focused images of near field sources.

Unlike optimization of the lensing properties of near field metamaterials, our technique allows essentially arbitrary focusing of electromagnetic energy anywhere within, above, or below a near field metamaterial. The time reversal technique we employ gives us the benefit of selectively and dynamically focusing energy, unlike when metamaterials are used as a lens, where the metamaterial design leads to a static focusing of the electromagnetic energy that cannot be altered.

Herein, we demonstrate a selective focusing of the EM energy using electromagnetic time reversal in the near field only, and so we desire a near field medium with a dispersive frequency response. The work here contrasts with the previous work that has demonstrated near field to far field conversion of EM energy, with TR then used to reverse the process yielding focusing at the original near field source, ultimately giving way to systems capable of highly localized focusing and far field super-resolution (i.e., resolution below that of the classical diffraction limit) imaging. Further, we leverage the properties of near field metamaterials (NF-MM) that have been shown to support the Fabry Perot type resonances of magnetostatic near field volume and surface waves, and even display the near field multipath effects, all in a subwavelength regime. In this way, near field metamaterials are uniquely suited for use as a dispersive medium for demonstrating the electromagnetic time reversal in the near field.

While the image formation and focusing of energy are possible with metamaterials (MMs) via a near field lensing effect, control of this behavior relies on fixed MM topologies and on optimization for a single frequency. Herein, however, we selectively and dynamically control the spatial focus of EM energy on subwavelength scales within the near field of a MM operating in the 40-50 MHz range, with the MM supporting magnetostatic waves with typical wavelengths in the range of 3-25 cm, depending on the excitation frequency.

Although other types of metamaterials could be employed, a specific example will be described merely for ease of communicating the broader concepts that are taught herein. In this case, the metamaterial may be an array of conductive coils. The conductive coils could be placed in a 1-demensional, 2-dimensional, or 3-dimensional array as desired for the particular application. In this case, the array can be considered to be either a 1-dimensional array or a 2-dimensional array, depending on how it is considered. In structure, as shown in FIG. 1(a), the metamaterial includes a printed circuit board (PCB) 12 that has eleven different coils 14 laterally spaced apart so that each coil 14 has a coil axis 15 passing through a center thereof, such that the axes 15 of the eleven coils are all parallel to and spaced apart from each other, as shown in FIG. 1(a). Each coil 14 completes nearly a complete 360-degree turn about the axis 15 and is terminated at opposite ends by connection to a capacitor 16. In this case, each coil 14 is electrically connected to a separate capacitor 16, and none of the coils are conductively connected to each other. Although any suitable capacitor value could be used, it has been found than a capacitance in the range of 5 to 100 pF is a suitable amount. Each coil and capacitor combination is essentially an LC resonator.

A pair of PCBs 12 of similar such structure are stacked on top of each other to form a bundle 18. As can be appreciated, the bundle 18 now contains twenty-two such coils, with eleven pairs of stacked coils 14. Each stacked pair of coils 14 has a single coil axis 15 that passes through the center of each of the coils of the pair.

Figure 1B:
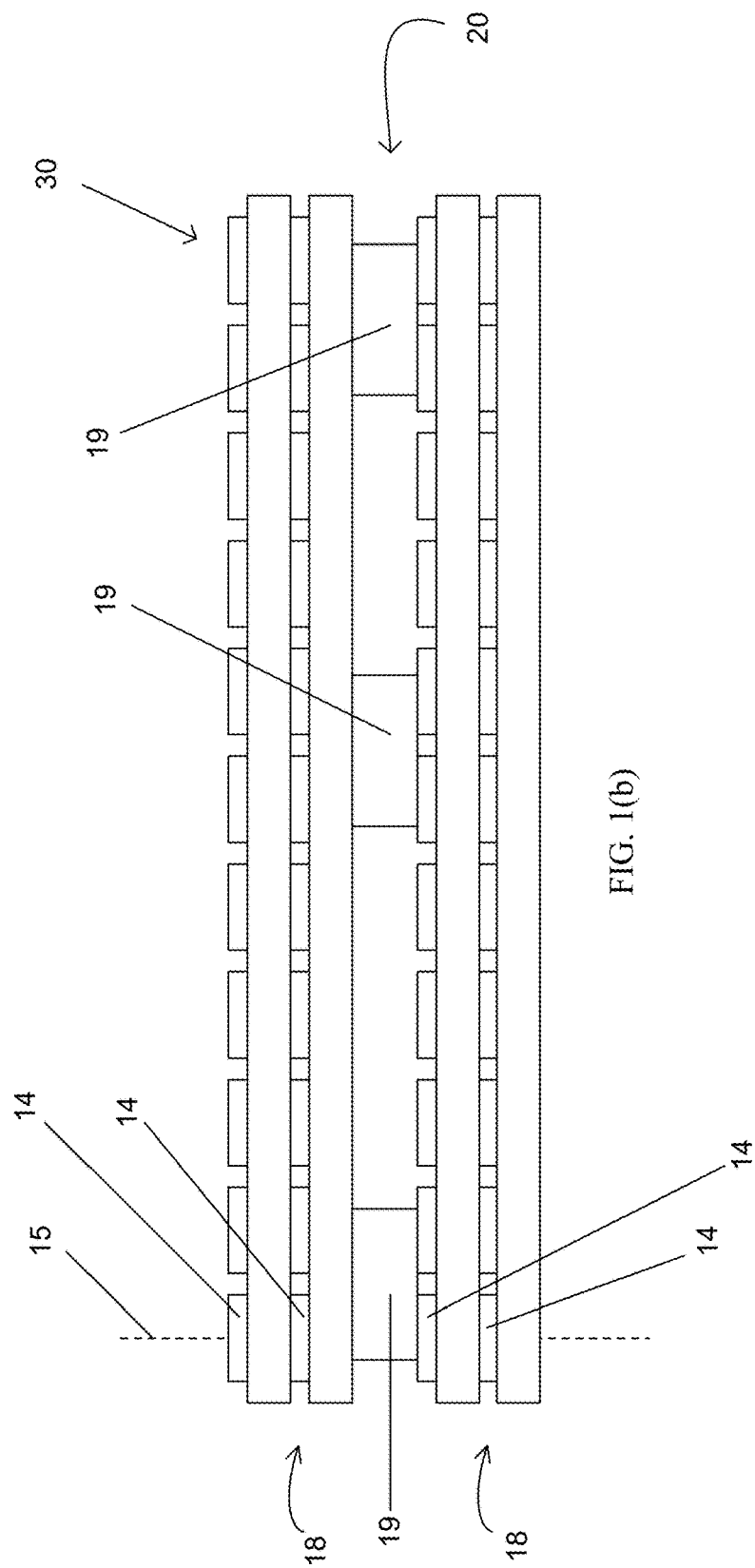
FIG. 1(b) an illustration of a stack of four PCBs of the type shown in FIG. 1(a).

A pair of such bundles 18 are then stacked on top of each other (separated by a plurality of spacers 19) to form an array 20 (shown in FIG. 1(b)), so that there are now a total of forty-four coils 14, arranged in eleven different stacks with each stack having four coils 14 therein, with all four coils 14 in each stack sharing a common coil axis 15. The spacing between the two bundles 18 in this particular case is 9.3 mm, although other distances could also be used. The size of each coil 14 is approximately 2.5 cm across each side of the generally-square coils, although other sizes could be used. Further detail is shown in FIG. 1(d) where one coil 14 is shown, and it can be seen that the coil does not quite compete a full turn around the axis 15 and that the opposite ends of the coil are terminated at opposite ends of the capacitor 16. The coil 14 may be generally square with the possibility of rounded corners or square corners, and each side of the square may have a dimension of approximately 2.5 cm. FIG. 1(e) shows the stack of four or more such coils 14 with common central axis 15. So, for each stack of four coils there are four separate capacitors. And none of the coils or capacitors are conductively connected to each other, either within a given stack or between stacks. Since a typical PCB thickness is 62 mils or roughly 1.6 mm, that is the spacing between the two lower coils and it is the spacing between the two upper coils. In this example, due to the thickness of the spacers 19, the second and third coils may be separated by approximately 8.5 mm. Also, the "variable height" of the coil of the measurement port may be 0.5 inches.

Figure 1C:
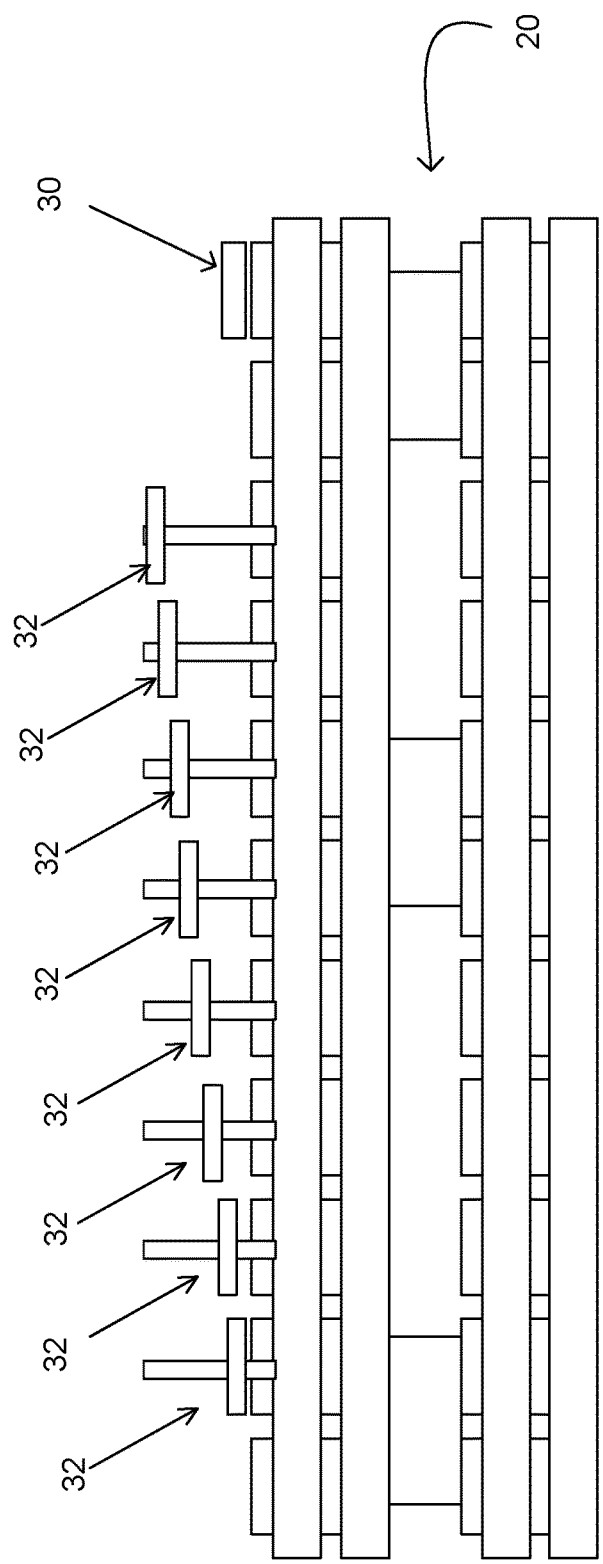
FIG. 1(c) of a stack such as is shown in FIG. 1b, with an input coil and a plurality of sensing coils added thereto.
Figure 1D:
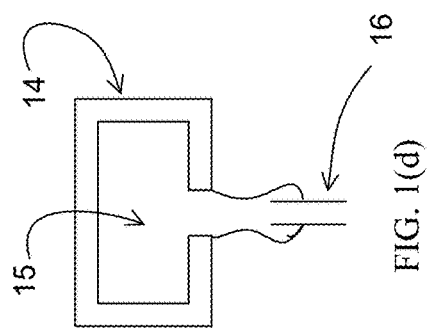
FIG. 1(d) is an illustration of a coil such as is shown on FIG. 1(a).
Figure 1E:
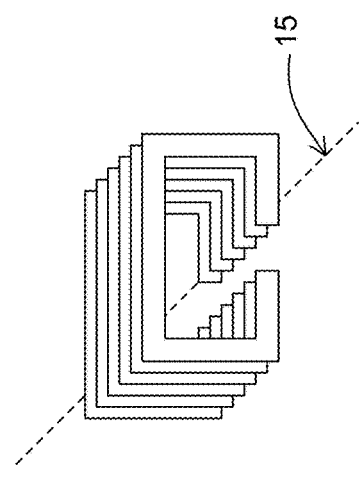
FIG. 1(e) is an illustration of a stack of coils such the coil of FIG. 1(d), shown in an aligned relationship.
Figure 1F:
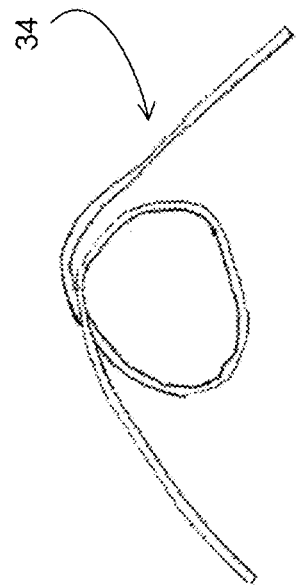
FIG. 1(f) is a coil for an input port, as shown in FIG. 1(c).
Figure 1G:
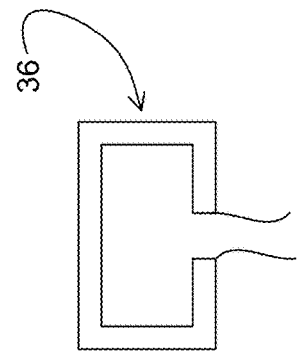
FIG. 1(g) is a coil for a measurement port, as shown in FIG. 1(c).

Further, for testing purposes, as shown in FIG. 1(c), the array 20 is provided with an input port 30 and a plurality of measurement ports 32. The input port 30 is created by placing an input (or driving) coil on top of the right-most of the eleven stacks of coils 14. In this example, as shown in FIG. 1(f), the input port 20 includes two turns of 12-gauge wire to form a coil 34 (in this case, circular turns having a diameter of approximately 2.5 cm), which is connected to an appropriate signal generator 38. In this example, a Vector Signal Generator (VSG) was used, although any other appropriate and suitable device for generating signals could be used. In addition, as shown in FIG. 1(g), the plurality of measurement ports 32 were created by positioning a separate single-turn generally-square coil 36 on top of each stack. In this case, a threaded plastic bolt is provided so that the vertical spacing between each stack of coils and its respective measurement port 32 can be varied. This variable spacing allows the height of each measurement port 32 to be generally adjusted in accordance with the lateral distance between the input port 30 and each respective stack of coils, which allows for the power received at each measurement port 32 to be normalized relative to each other. Note that, in general, the measurement ports 32 may be placed closer to their respective stacks as the distance from the right-most stack and input port 30 is increased. The coil 34 of the input port 30 may be placed as closely on top of the right-most stack as is practical, so as to couple as much RF energy into the coils of the metamaterial as possible.

It is important to note that while one type of metamaterial is discussed in detail here, the techniques taught herein are equally applicable to other types of metamaterials. Most any type of array of coupled resonators could serve as a metamaterial. For example, another type of metamaterial that could be used would be an array of metal rods that capacitively couple to each other at a resonant frequency. Thus, the techniques taught and claimed herein should not be considered to be limited to any particular type of metamaterial.

We now lay a mathematical foundation for TR, followed by experimental results that corroborate the theory of near field time reversal. Lastly, the utility of this technique is illustrated by selectively addressing one of eight receivers coupled to the metamaterial (MM), as shown in FIG. 2(a). In this experiment, the receiver loads are LEDs that can be selectively turned on by using TR to focus energy at any desired LED's receiver. To add an intuitive and physical appreciation of the EM focusing we are pursuing, a qualitative plot (which is the result of an actual electromagnetic finite element based time reversal simulation) of the time reversal focused magnetic fields above a 1-D NF-MM is shown in FIG. 2(b). The source is the rightmost coil, but by using TR, we have forced focusing to take place a little farther than half way down the slat (having arbitrarily chosen which coil to focus on), as indicated at the [passive] receiver location by the high density of flux lines as well as the high intensity of the magnetic field component directed normal to the slat (indicated by the dark blue coloring). This picture, showing the focusing of flux at an arbitrary location, is exactly what we achieve at any one of the 8 receiver locations used in this work by using the TR process.

As discussed, FIG. 2(a) shows the setup of the MM system used in the TR experiments of this work. FIG. 2(b) shows the simulated TR focusing (using commercial finite element software Comsol Multiphysics) for a single slat of coils of FIG. 2(a). Streamlines are magnetic flux density and are proportional to the magnitude of the magnetic flux component directed normal to the coils. This is a temporal snapshot of the magnetic flux at the instant when TR focusing occurs after having rebroadcast the TR impulse response between source (rightmost coil on the slat) and receiver (black circle above slat).

The analysis we are about to undertake is in fact very general and applies to the near and far field TR systems broadcasting between one or more transmitters and one or more receivers. These transmitters and receivers could be antennas, coupled coils, etc. However, to aid in developing a less abstract description here, we will be specific in using the 1D NF-MM setup of this work to describe the time reversal process. The results are equally valid (although more complicated) for 2D and 3D metamaterials.

The MM channel is shown in FIG. 2(a), and consists of a series of 2.5 cm printed circuit board (PCB) coils, closely spaced in a line of 11 coils total to form a slat. Two slats are placed directly one on top of the other forming a bundle of 2. Finally, two of these bundles are spaced 9.3 mm apart to form the total 1D MM. The exact design of the 1D MM was not a focus of this work (i.e., we did not optimize or characterize it), except that its construction was guided by the need to form a subwavelength, and dispersive near field medium. A source coil was placed atop the far right end of the 1D MM to couple to into it, FIG. 2(a). A photograph of the physical setup is also shown in FIG. 3(a).

Figure 3A:
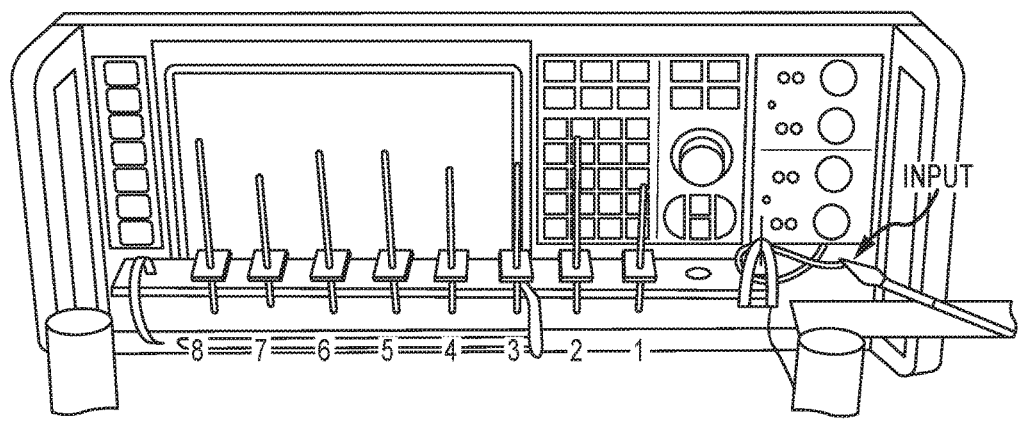
FIG. 3(a) is a photo of a vector signal generator connected to an arrangement such as is shown in FIG. 1(c) or FIG. 2(a).
Figure 3B:
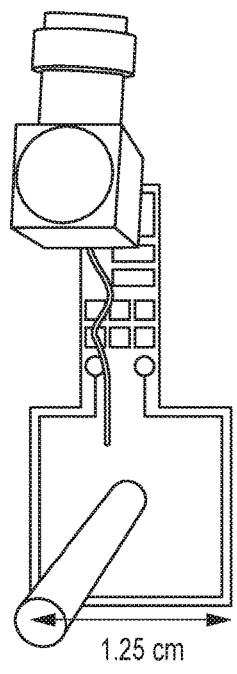
FIG. 3(b) is a photo of a measurement port such as is shown in FIG. 1(g), with a coaxial cable connector.
Figure 3C:
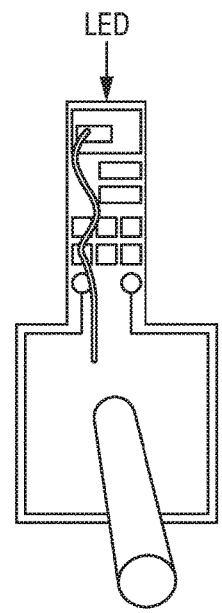
FIG. 3(c) is a photo of a measurement port such as is shown in FIG. 1(g), with an LED attached to the port.

As discussed, FIG. 3(a) shows a photograph of the experimental apparatus of this work. FIG. 3(b) shows a close-up of the receiver loop used to collect the waveform data. FIG. 3(c) shows the same receiver as in FIG. 3(b) but with an LED attached as a load. The VSG is shown in the background of FIG. 3(a).

To be explicit about our apparatus and its operation in the near field, we here note that the center frequency of operation is 44.25 MHz, with a corresponding free space wavelength of 6.8 m (actually the energy applied is a wideband impulse of RF energy that may be centered near 45 MHz and have a significant amount of energy throughout a 20 MHz span about that center frequency; although other values could be used like a wideband impulse of RF energy with a center frequency of 2 GHz, with a 100 to 500 MHz there around). Anyway, if we use a standard approximation to where the near field ends of $k=\delta 2p\,\flat$, where k is the free space wavelength, then the near field extends no farther than about 1 m, and we expect a very weak coupling to receivers outside this region. To confirm this, we used a Vector Network Analyzer (VNA) to measure the transmission coefficient to a 7.6 cm diameter coil receiver located at 1 cm above the MM and 1 m above the MM. In the frequency band where the MM operates, we find $|S_{21}|$ is, at best, −7 dBm at 1 cm and, at best, −60 dBm at 1 m, thus the 5 orders of magnitude difference confirms that coupling to propagating waves from the device is negligible, and we have limited ourselves to the near field. Further, since the MM unit cells are composed of coil resonators, it is known that coupling to receivers drop off very quickly after the distance between the source and receiver is about 1 coil diameter. Thus, for this work, we will be working very deep in the near field or within about 1 coil diameter (2.5 cm) of the MM, where the magnetic fields and coupling to receivers should be strongest.

Now, returning to establish the TR process used here, first consider the transmitter coil as it broadcasts a short pulse into the MM with N receiver locations above the MM, where, in this case, N=1, 2.8. In the time domain, the short pulse, p(t), is first applied to the input coil, and then the output at any one of the receivers is, mathematically, the convolution of the pulse with the channel impulse response between the source and that receiver, $h_N(t)$. Thus, in block diagram notation, $$p(t) \rightarrow \boxed{h_N(t)} \rightarrow p(t) \otimes h_N(t), \quad (1)$$

where $\otimes$ is the convolution operator. After the impulse response is recorded at any one of the N receiver coil locations, this received signal is then reversed in time and rebroadcast through the channel. The response to the TR signal at some receiver coil, M (where N may or may not be equal to M), is then $$a_N p(T-t) \otimes h_N(T-t) \rightarrow \boxed{h_M(t)} \rightarrow [a_N p(T-t) \otimes h_N(T-t)] \otimes h_M(t), \quad (2)$$

where T is a time delay to make the system causal, and $a_N$ is a normalization constant which sets the time reversed signal's energy, and can be used to compensate for unrecoverable energy lost to heat (e.g., absorption by a conductor).

To be specific, the above two steps are implemented in this work by doing the following: First, a Gaussian pulse, p(t), with full width half maximum (FWHM) bandwidth of 12.5 MHz, modulated at a carrier frequency of 44.25 MHz, and at a repetition rate of 3 μs is uploaded to the in-phase channel of a Vector Signal Generator (VSG). The signal is injected into the 1D MM via a source coil as shown in FIG. 2(a). Next, the In-phase and Quadrature channels (I and Q channels, respectively) of the pulse response at each of the 8 receiver locations in FIG. 2(a) is recorded using a single turn, 1.25 cm square, PCB pick-up coil (FIG. 3(b)), connected to a Vector Signal Analyzer (VSA). The recorded I and Q waveforms are then reversed in time, (the Q-channel's amplitude must also be flipped in sign to account for TR of the carrier), normalized, and then re-broadcast through the system via the same input coil. The I and Q pulse responses (original and time reversed) for two example coils (coil numbers N=2, 7) are shown in FIG. 4(a).

Figure 4A:
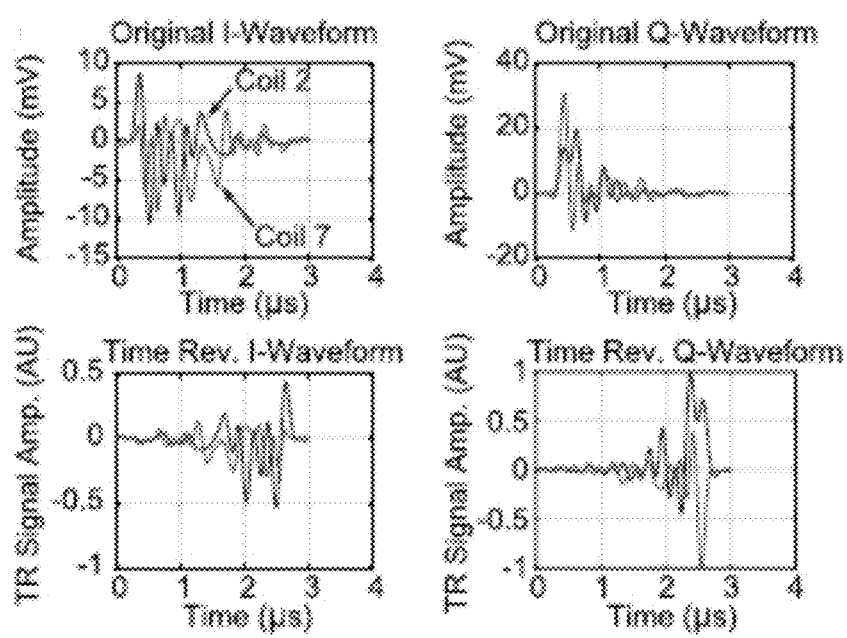
FIG. 4(a) is a graph of the original I and Q time versus amplitude waveforms and the time reversed I and Q waveforms.
Figure 4B:
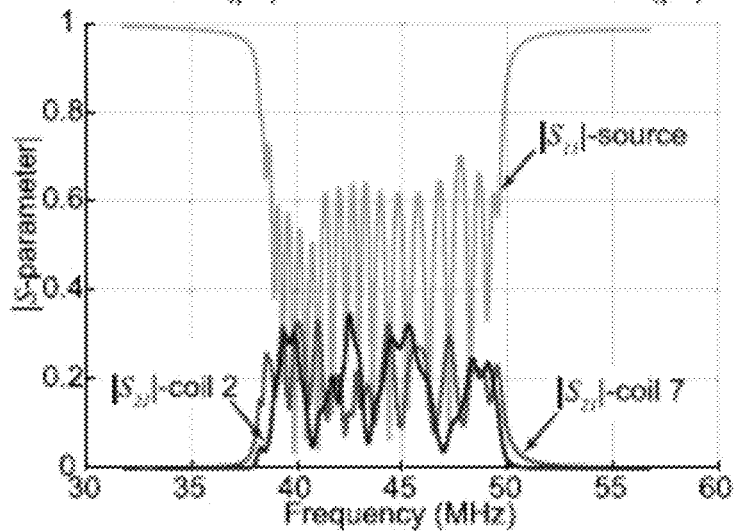
FIG. 4(b) is a graph of measured S-parameter data showing the reflection coefficient, S11, presented to the source as well as the transmission spectra, S21, between the source and two receiver coils at positions 2 and 7 of the arrangement of FIG. 2(a).

As discussed, FIG. 4(a) shows example I and Q waveforms, along with the time reversed wave-forms used in the experimental TR focusing system. FIG. 4(b) provides measured S-parameter data showing the reflection coefficient, S11, presented to the source as well as the transmission spectra, S21, between the source and two receiver coils at positions 2 and 7 of FIG. 2(a).

While the mathematical analysis in the time domain involves cumbersome convolution operators, the analysis becomes straightforward in the frequency domain where convolution is a simple multiplication. Thus, to gain an intuitive insight into the focusing effect of the TR process, we now recapitulate the analysis in the frequency domain, where the Fourier transform of the pulse, P (ω) (where ω is angular frequency) is first applied to the Nth channel with a frequency response $H_N$ (ω), yielding $$P(\omega) \rightarrow \boxed{H_N(\omega)} \rightarrow P(\omega) H_N(\omega), \quad (3)$$

In the frequency domain, TR is equivalent to phase conjugation; thus, the time reversed signal is $a_N P^*(\omega) H^*_N(\omega)$, with * indicating the complex conjugate. After sending these frequency components back through the channel to be received at the Mth receiver, the final output, V ($\omega$) is $$a_N P^*(\omega) H^*_N(\omega) \to \boxed{H_M(\omega)} \to a_N P^*(\omega) H^*_N(\omega) H_M(\omega) = V(\omega), \quad (4)$$

At the instant of focusing (which mathematically can be shown to be time t=0 in this analysis) the received signal's value (in this case voltage, v(t)) can be found using the inverse Fourier transform:

$$v(t=0) = \int_{-\infty}^{\infty} a_N P^*(\omega) H^*_N(\omega) H_M(\omega) d\omega, \quad (5)$$

Through Eq. (5), it can be seen that the key to focusing high or low energy (instantaneously) at any receiver M when sending the time reversed response of receiver N is to maximize the above integral for high energy and minimize it for low energy. This is essentially equivalent to maximizing or minimizing the cross-correlation between $H^*_N(\omega)$ and $H_M(\omega)$.

Optimally, for completely selective focusing energy at receiver N, two conditions need to be true: (1) when N≠M, the channel responses of receiver N and M need to be orthogonal and thus Eq. (5) evaluates to 0 (i.e., their cross-correlation is zero), and (2) for N=M the result should be non-zero (i.e., the channel autocorrelation is nonzero). In this way, energy is only focused at the Nth receiver (at the instant t=0) when transmitting the TR signal of that particular receiver.

Practically speaking, this optimal case cannot be exactly realized. Short of that, use of a dispersive medium (i.e., the NF-MM) can yield a system that has relatively orthogonal channels when N≠M Thus, a route becomes clear as to how energy can be maximized at receiver N when re-broadcasting its time reversed impulse response, while simultaneously assuring the energy received at the other M receivers is minimal. Lastly, we note that the above mathematics are only strictly true for the instant when focusing at the original (N=M) receiver takes place. At other instants in time, the received signal voltage at any coil may be higher or lower than those predicted by (5), but the net effect is that the more dissimilar the channel responses of coils N and M are, then the larger the ratio of the peak voltage of the desired receiver will be to the peak voltage observed at all other receivers, when looking over all time.

To again be explicit about the above using the physical system of this work, examples of the transmission coefficient, $S_{21}$ between the source and receiver coils number 2 and 7 are shown in FIG. 4(b). Even without computation, the dissimilarity between the two spectra (i.e., their cross-correlation) is intuitively clear. Additionally, the dispersive nature of the MM used here is evident by noting the many modes present in the source's reflection coefficient spectrum, $S_{11}$.

When designing the blue input coil, we adjusted the number of turns and its height above the MM such that $S_{11}$ was as close to 0 as possible for as many of the modes seen as possible (see FIG. 4(b)). By minimizing reflections across frequency, we are assured that as much power as possible is actually delivered to the MM in as many modes as possible, which can then participate in the TR focusing effect.

Quantitatively, we measured the transmission spectrum at all 8 receiver coil locations in FIG. 2(a) and then computed the integral in Eq. (5) for N, M=1, 8. The results are represented in the matrix of FIG. 5(d), where the values have been normalized to the maximum value of the resulting 8×8 matrix. Along the diagonal, where N=M the values are high, signifying a strong autocorrelation. On the other hand, the off-diagonal values are only small fractions of the diagonal values, signifying weaker cross-correlation. Taken together, the results of FIG. 5(d) all signify a highly dispersive NF system, suitable for exploiting TR to attain focusing in the near field. Below, we continue with a description of the experimental TR results.

Figure 5A:
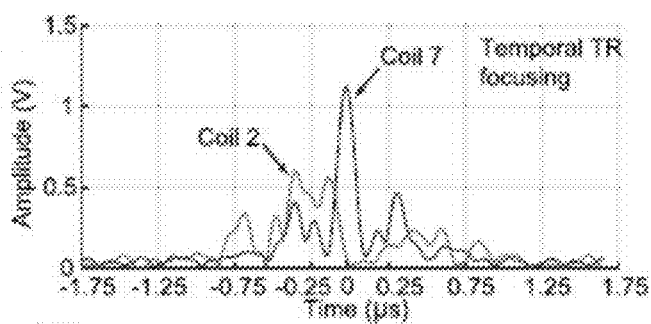
FIG. 5(a) is a graph illustrating temporal Time Reversal focusing.
Figure 5B:
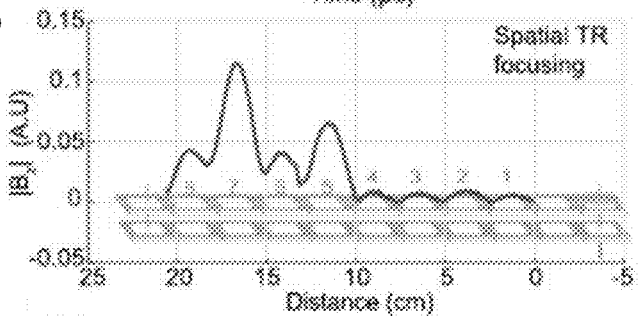
FIG. 5(b) is a graph illustrating spatial Time Reversal focusing.
Figure 5C:
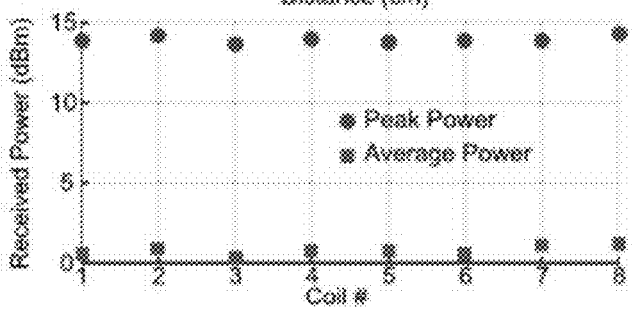
FIG. 5(c) is a graph showing peak and average power levels obtained by setting the individual heights of the 8 PCB receivers above the MM so that they have approximately the same values when their own TR signal is emitted from the source coil.
Figure 5D:
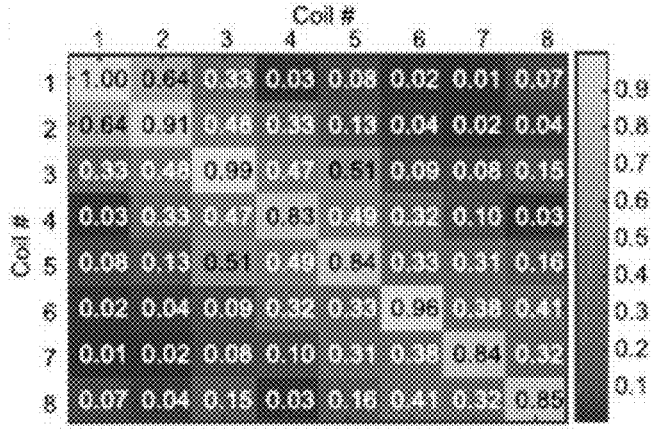
FIG. 5(d) shows a matrix of values found by computing the integral in Eq. (5) after measuring the channel frequency response between the source and 8 receivers in FIG. 2(a).

As discussed, FIG. 5(a) shows an example of temporal TR focusing when sending the TR waveform of coil number 7 back through the system. FIG. 5(b) shows an example of the spatial TR focusing: coil 7's TR waveform is broadcast from the receiver and a 3 mm diameter coil is scanned 7 mm above the MM surface. The flux at the instant of TR focusing is plotted as a function of position. FIG. 5(c) shows peak and average power levels obtained by setting the individual heights of the 8 PCB receivers above the MM so that they have approximately the same values when their own TR signal is emitted from the source coil. FIG. 5(d) shows a matrix of values found by computing the integral in Eq. (5) after measuring the channel frequency response between the source and 8 receivers in FIG. 2(a).

After the time reversed channel pulse response from any coil N is sent back through the channel from the source coil, TR focusing takes place at the same receiver coil, N. For the other M coils there is no focusing effect and the peak signal level is diminished compared to coil N. An example of this is shown in FIG. 5(a), where the received signal at coils 2 and 7 are plotted for the case when the time reversed signal of coil N=7 is sent back through the system. Here, strong temporal focusing at coil number 7 is evident. The peak voltage is almost twice that of coil number 2 (or almost 6 dB more power). At the instant of focusing (t=0), the ratio of received voltages is much larger.

FIG. 5(b) goes further to illustrate the spatial TR focusing at the instant in time that the fields focus at coil number 7. To obtain this plot, once again coil number 7's time reversed impulse response is re-broadcast through the MM and then the flux density above the MM (7 mm above its surface) is recorded using a small sensing coil. This plot clearly indicates a peak magnetic flux density at the coil number 7's location when TR focusing occurs. This plot is essentially a 1-Dimensional magnitude slice of the scenario depicted in FIG. 2(b).

After all 8 channel responses were recorded, the VSG was programmed to output the same amount of power when re-broadcasting any of the TR impulse responses. As a normalization step, all 8 receivers had their height above the MM adjusted so that they each absorbed the same amount of power when their TR signal was sent; this is the separation h, of FIG. 2(a) between the MM coil and the square receiver loops. The result is plotted in FIG. 5(c). Adjusting the height between the output loops and the MM coils effectively increases (closer) or decreases (farther) the coupling between receiver and MM and hence the received signal strength. Thus, this amounts to regulating the total energy absorbed by the load when N=M (i.e., autocorrelation energy), and is a way to make all 8 loads absorb the same energy when their TR signal is sent. This is a necessary step since NF-MM waves suffer attenuation as they propagate, so receivers that are laterally farther away from the source are disadvantaged in how much energy they receive, compared to receivers that are (laterally) closer to the source coil. For this initial study, we did not focus on what an optimal coupling from receiver to MM might be, but rather we were just seeking to ensure that all receivers got the same amount of power when their TR signal was sent, and adjusted the coupling experimentally to achieve this result, FIG. 5(c). In all experiments up to this point, the load was the 50Ω port of the VSA. In a final experiment described below, the load was changed to be an LED (e.g., blue) with measured "on" impedance of less than 10Ω and a nearly 0 reactive impedance in the frequency band of operation. It is also worth mentioning that, under the condition that there is no load, the energy of the injected signal is dissipated by the metamaterial itself (specifically in the ohmic losses of the unit cell's copper coils). As mentioned earlier, energy loss to radiative modes is negligible as we are in a strongly near field regime.

Figure 6:
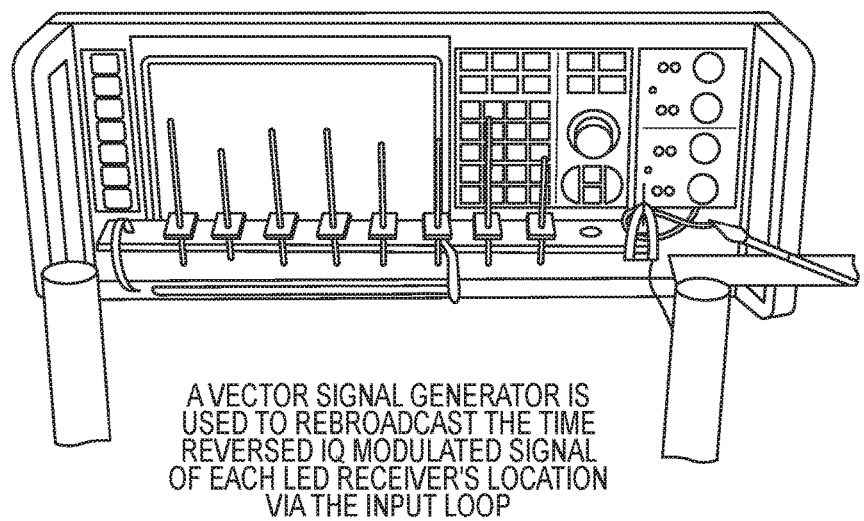
FIG. 6 shows the selective powering of LEDs using TR focusing.

FIG. 6 shows a still image that shows the selective powering of LEDs using TR focusing. Each LED is turned on by continuously sending the TR channel response of the desired LED. This signal is sent at a repetition rate of 3 μs and since the TR focused waveform pushes only the selected LED above its turn-on threshold voltage, only that LED appears to be on. The LED is turning on and off very fast due to the 3 μs repetition rate of the TR waveform, but to the human eye, it appears to be on continuously.

To demonstrate the remarkably strong selective TR focusing ability of the simple MM used here, we placed the PCB receiver loops at the 8 locations of FIG. 2(a), but now connected to LED loads. The PCB loops were mounted on the threaded rods so that their height, h, above the MM could be adjusted. The heights were adjusted to be approximately the same as when the data of FIG. 5(c) was recorded, so they would receive approximately the same power when their TR signal was sent. Some fine tuning of their heights was necessary, but the result was that we were able to selectively turn on the LEDs with approximately the same brightness simply by sending the TR signal of whichever one was desired. The other LEDs did not visibly turn on except the one whose TR signal was broadcast. The selective turn-on and subsequent powering of a given LED is owed to the fact that the TR focusing in time pushes the selected LED above its turn-on threshold voltage for a brief period of time and so it emits light. Since we are replaying the TR signal of the desired receiver continuously (i.e., we replay the TR signal at a repetition rate of 3 μs), the chosen LED appears to be on continuously to the human eye, even though it is actually flickering on and off at around $0.33 \times 10^6$/s. The other diodes do not turn on since they are, at all times, below the threshold unless their own time reversed channel response is sent. This is in accordance with FIG. 5(a) where, as an example, the focusing occurred at coil 7, but coil 2's peak voltage was, at its best, half that of the selected coil 7.

Figure 7:
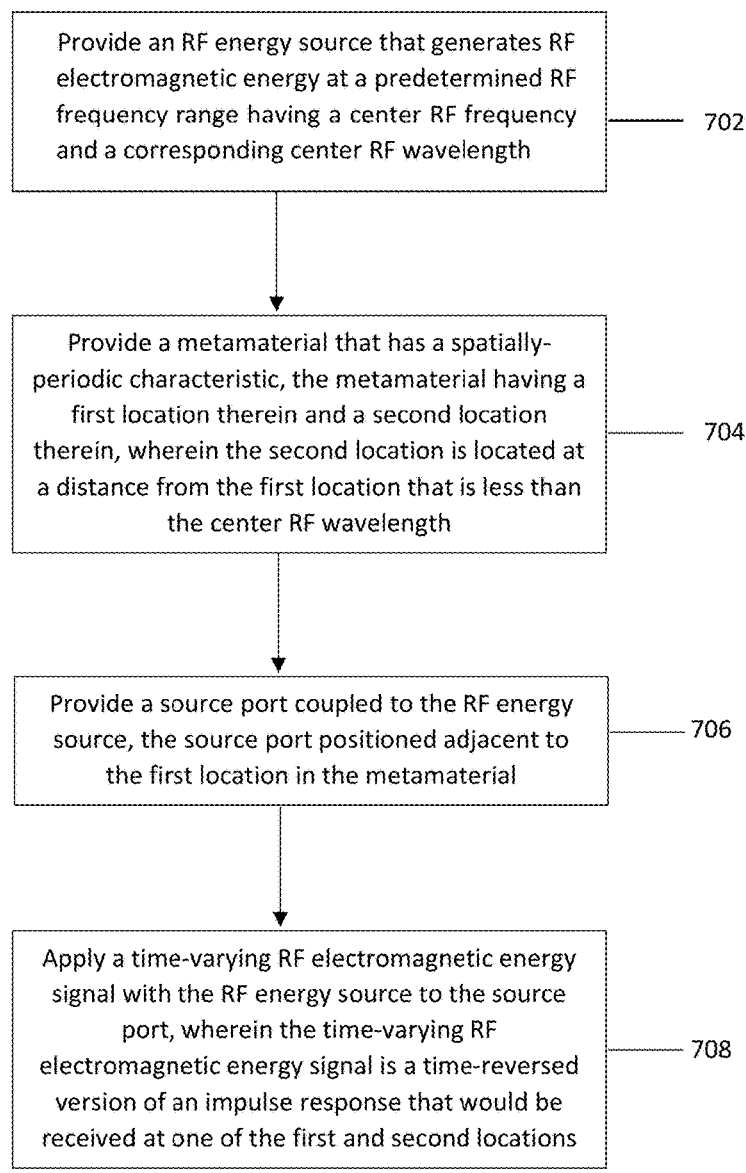
FIG. 7 shows a flowchart of a method according to the teachings herein.
Figure 8:
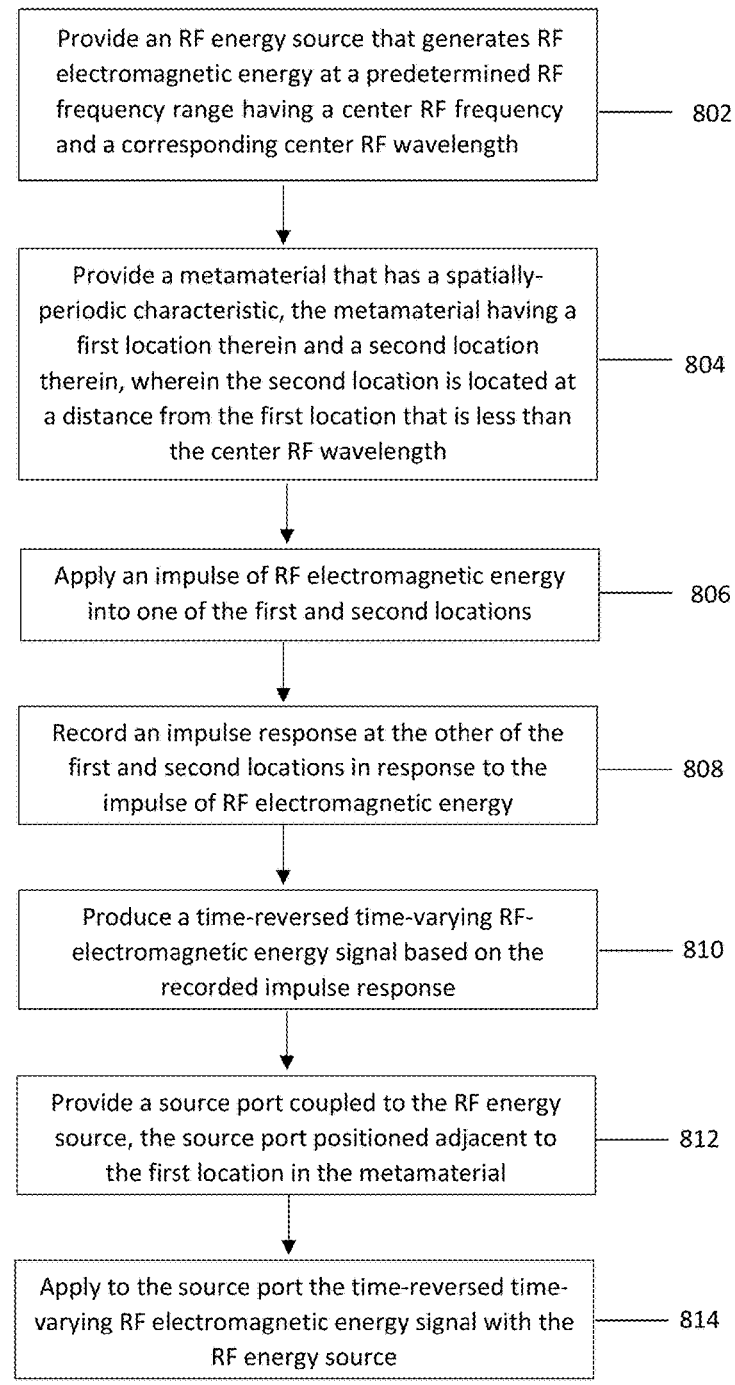
FIG. 8 shows a flowchart of another method according to the teachings herein.

A pair of flowcharts showing methods disclosed herein are shown in FIGS. 7 and 8. FIG. 7 shows a method (700) for focusing RF energy that includes: providing (702) an RF energy source that generates RF electromagnetic energy in a predetermined RF frequency range having a center RF frequency and a corresponding center RF wavelength; providing (704) a metamaterial that has a spatially-periodic characteristic, the metamaterial having a first location therein and a second location therein, wherein the second location is located at a distance from the first location that is less than the center RF wavelength; providing (706) a source port coupled to the RF energy source, the source port positioned adjacent to the first location in the metamaterial; and applying (708) a time-varying RF electromagnetic energy signal with the RF energy source to the source port, wherein the time-varying RF electromagnetic energy signal is a time-reversed version of an impulse response that would be received at one of the first and second locations in response to an impulse of RF electromagnetic energy introduced into the other of the first and second locations. It should be noted that the first location can be any location in the metamaterial, and the location could be selected by an operator, user, or designer.

FIG. 8 shows a method (800) for focusing RF energy that includes: providing (802) an RF energy source that generates RF electromagnetic energy in a predetermined RF frequency range having a center RF frequency and a corresponding center RF wavelength; providing (804) a metamaterial that has a spatially-periodic characteristic, the metamaterial having a first location therein and a second location therein, wherein the second location is located at a distance from the first location that is less than the center RF wavelength; applying (806) an impulse of RF electromagnetic energy into one of the first and second locations; recording (808) an impulse response at the other of the first and second locations in response to the impulse of RF electromagnetic energy; producing (810) a time-reversed time-varying RF-electromagnetic energy signal based on the recorded impulse response; providing (812) a source port coupled to the RF energy source, the source port positioned adjacent to the first location in the metamaterial; and applying (814) to the source port the time-reversed time-varying RF electromagnetic energy signal with the RF energy source. It should be noted that the first location can be any location in the metamaterial, and the location could be selected by an operator, user, or designer.

Herein, we have demonstrated the electromagnetic time reversal in the near field to near field regime and demonstrated a strong focusing of the magnetic field above the surface of a metamaterial. Because of this focusing, the magnetic field at the focus point is greater than the magnetic field at adjacent points, and greater than at all other points other than at the point of the original application of the RF energy. Our results here have several implications for practical systems. As an example, given the success with LEDs, our system would lend itself to display technologies where it would obviate the need for row and column decoders. More powerfully, the ability to differentiate between receivers spaced so closely together has a direct impact on increasing the channel capacity of, for example, near field radio frequency identification (RFID) systems; in a very small space, multiple channels can be addressed independently. Finally, the techniques here can be applied to formation systems. Imaging is among the most compelling applications since the fundamental focusing is limited by the MM element size, not the wavelength of the RF energy as would traditionally be expected. In general, this work demonstrates a means to manipulate the electromagnetic energy in the near field, and so extends the possibilities of control of wave phenomena on a subwavelength scale.

It should be understood that, with the teachings herein, any combination of number of input ports and focus locations (which could be called output ports) could be employed. While the specific embodiments here have shown a single input port and a single focus location, there could be a plurality of input ports and a single focus location, a single input port and a plurality of focus locations, or a plurality of input ports and a plurality of focus locations.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A method for focusing RF energy, comprising:
providing an RF energy source that generates RF electromagnetic energy in a predetermined RF frequency range having a center RF frequency and a corresponding center RF wavelength;
providing a metamaterial that has a spatially-periodic characteristic, the metamaterial having a first location therein and a second location therein, wherein the second location is located at a distance from the first location that is less than the center RF wavelength;
providing a source port coupled to the RF energy source, the source port positioned adjacent to the first location in the metamaterial; and
applying a time-varying RF electromagnetic energy signal with the RF energy source to the source port, wherein the time-varying RF electromagnetic energy signal is a time-reversed version of an impulse response that would be received at one of the first and second locations in response to an impulse of RF electromagnetic energy introduced into the other of the first and second locations.

2. A method as defined in claim 1, wherein the applying of the signal to the source terminal at the first location causes a focusing of RF energy at the second location in the metamaterial.

3. A method as defined in claim 2, wherein the focusing of RF energy at the second location includes the RF energy being significantly greater in magnitude instantaneously at the second location than at a location immediately adjacent the second location.

4. A method as defined in claim 3, wherein the focusing of RF energy at the second location includes the RF energy being significantly greater in magnitude instantaneously at the second location than at any other location in the metamaterial.

5. A method as defined in claim 2, wherein the focusing of RF energy at the second location in the metamaterial is used for power transfer.

6. A method as defined in claim 2, wherein the focusing of RF energy at the second location in the metamaterial is used for data transfer.

7. A method as defined in claim 2, wherein the focusing of RF energy at the second location in the metamaterial is used for sensing.

8. A method as defined in claim 1, wherein the time-varying RF-electromagnetic energy signal is generated by:
applying an impulse of RF electromagnetic energy into the other of the first and second locations;
recording an impulse response at the one of the first and second locations in response to the impulse of RF electromagnetic energy; and
producing the time-reversed time-varying RF-electromagnetic energy signal based on the recorded impulse response.

9. A method as defined in claim 1, wherein the metamaterial includes a series of spaced-apart coupled resonators.

10. A method as defined in claim 1, wherein the metamaterial includes a two-dimensional array of spaced-apart coupled resonators.

11. A method as defined in claim 1, wherein the metamaterial includes a three-dimensional array of spaced-apart coupled resonators.

12. A method as defined in claim 1, wherein the first location in the metamaterial is a selectable location.

13. A method for focusing RF energy, comprising:
providing an RF energy source that generates RF electromagnetic energy at a predetermined RF frequency range having a center RF frequency and a corresponding center RF wavelength;
providing a metamaterial that has a spatially-periodic characteristic, the metamaterial having a first location therein and a second location therein, wherein the second location is located at a distance from the first location that is less than the center RF wavelength;
applying an impulse of RF electromagnetic energy into one of the first and second locations;
recording an impulse response at the other of the first and second locations in response to the impulse of RF electromagnetic energy;
producing a time-reversed time-varying RF-electromagnetic energy signal based on the recorded impulse response;
providing a source port coupled to the RF energy source, the source port positioned adjacent to the first location in the metamaterial; and
applying to the source port the time-reversed time-varying RF electromagnetic energy signal with the RF energy source.

14. A method as defined in claim 13, wherein the applying of the signal to the source terminal at the first location causes a focusing of RF energy at the second location in the metamaterial.

15. A method as defined in claim 14, wherein the focusing of RF energy at the second location includes the RF energy being significantly greater in magnitude instantaneously at the second location than at a location immediately adjacent the second location.

16. A method as defined in claim 13, wherein the metamaterial includes a two-dimensional array of spaced-apart coupled resonators.

17. A system, comprising:
an RF energy source that generates energy at a predetermined RF frequency range having a center RF frequency and a corresponding center RF wavelength;
a metamaterial that has a spatially-periodic characteristic;
an RF energy source terminal located at a first location and a first orientation relative to the metamaterial; and
an RF energy receiver terminal located at a second location and a second orientation relative to the metamaterial, wherein the second location is located at a distance from the first location that is less than the center RF wavelength;
wherein the RF energy source applies a time-varying RF electromagnetic energy signal with the RF energy source to the source port, wherein the time-varying RF electromagnetic energy signal is a time-reversed version of an impulse response that would be received at one of the first and second locations in response to an impulse of RF electromagnetic energy introduced into the other of the first and second locations.

18. A system as defined in claim 17, wherein the applying of the signal to the source terminal at the first location causes a focusing of RF energy at the second location.

19. A system as defined in claim 18, wherein the focusing of RF energy at the second location includes the RF energy being significantly greater in magnitude instantaneously at the second location than at a location immediately adjacent the second location.

20. A system as defined in claim 17, wherein the time-varying RF-electromagnetic energy signal is generated by:

applying an impulse of RF electromagnetic energy into the other of the first and second locations;

recording an impulse response at the one of the first and second locations in response to the impulse of RF electromagnetic energy; and producing the time-reversed time-varying RF-electromagnetic energy signal based on the recorded impulse response.

\* \* \* \* \*